Patented Oct. 28, 1941

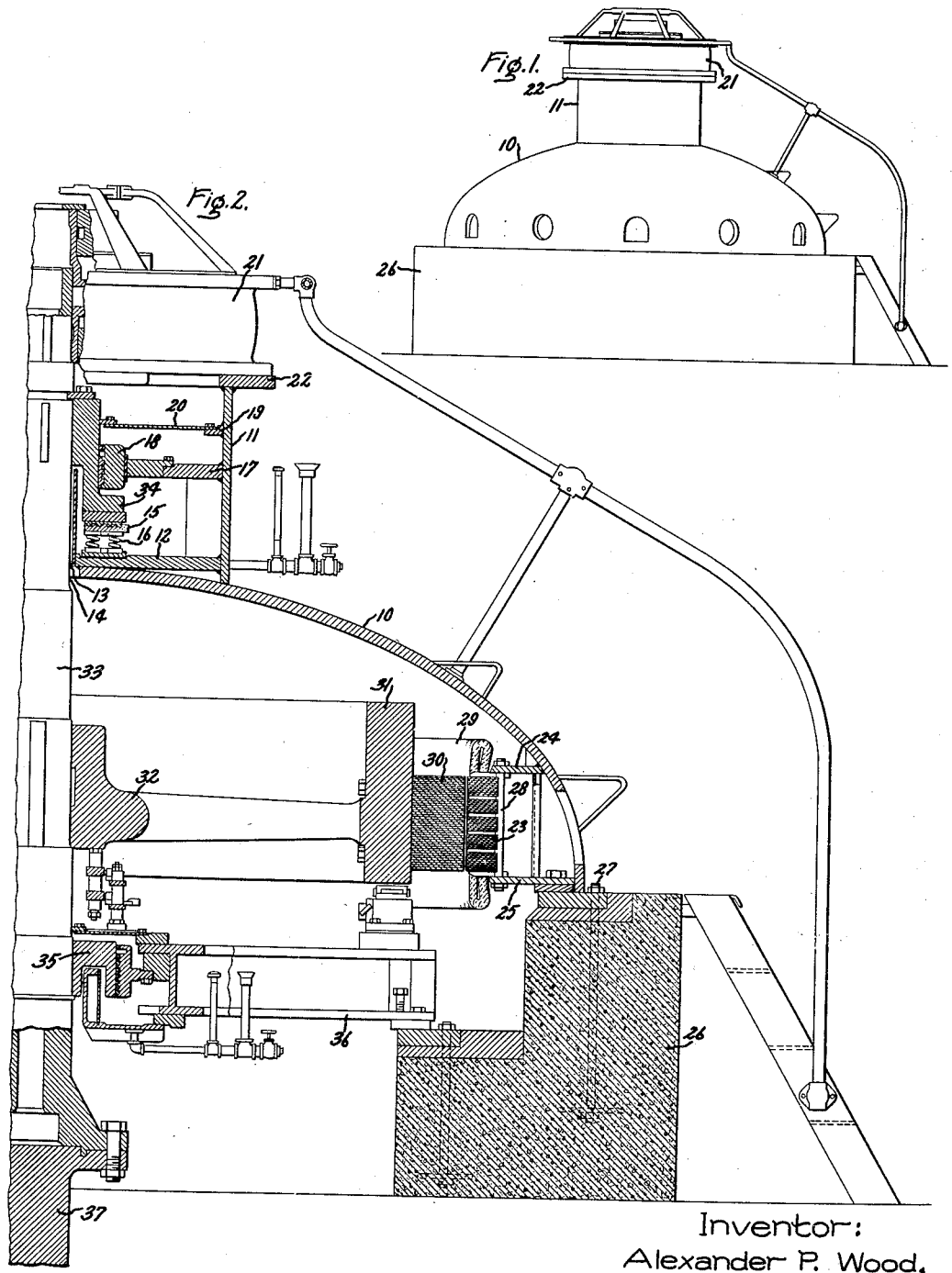

2,260,814

UNITED STATES PATENT OFFICE 2,260,814

FABRICATED DYNAMOELECTRIC MACHINE

Alexander P. Wood, Schenectady, N. Y., assignor to General Electric Company, a corporation of New York Application December 20, 1939, Serial No. 310,203

4 Claims. (Cl. 171—252)

My invention relates to dynamo-electric machines and more particularly to fabricated frame members therefor.

Heretofore some dynamo-electric machines have been designed with frame members having a number of machined parts welded together and a separate machined bearing bracket welded thereto.

An object of my invention is to provide a dynamo-electric machine with a fabricated combined frame and bearing bracket member which is simple and sturdy in construction and which may be readily manufactured with a minimum of cost.

I accomplish this by providing a combination one-piece streamline frame and bearing bracket member having welded thereto a bearing housing.

Further objects and advantages of my invention will become apparent from the following description referring to the accompanying drawing, and the features of novelty which characterize my invention will be pointed out with particularity in the claims annexed to and forming a part of this specification.

In the drawing Fig. 1 is a side elevational view of a dynamo-electric machine provided with an embodiment of my invention; and Fig. 2 is a partial side elevation, partly in section, of the machine illustrated in Fig. 1.

Referring to the drawing, in Fig. 1 I have illustrated a dynamo-electric machine including a stationary member having a combination one-piece frame and bearing bracket member 10 of my improved type and a bearing housing 11 attached thereto in any suitable manner, such as by welding. This dynamo-electric machine has reference to any type of machine, and in the illustrated embodiment of my invention I have shown a vertical type machine which may be attached to any suitable prime mover, such as a turbine. The member 10 is streamlined and, as will be seen more particularly in Fig. 2, is made of a single piece of metal fashioned into a suitable shape. I have found the dished or ellipsoidal dome or arch shape illustrated in the drawing to be particularly advantageous for vertical dynamo-electric machines. However, any other suitable shape may be used, depending upon the particular installation for which the frame is intended.

A single piece of metal may be formed into a dished or ellipsoidal member in any suitable manner, and I have found that this shape may be expeditiously formed by first pressing a steel ingot while hot into the shape of a dish and then flattening the edges thereof by slowly moving a die towards the edge while rotating the dished frame member in its heated condition.

In order to provide a suitable support for a thrust bearing, I attach the bearing housing 11 to the outside surface of the combination one-piece frame and bearing bracket member 10 in any suitable manner, such as by welding. The bearing housing 11 is a tubular member to the inside surface of which I attach a thrust bearing support 12 which has a bore 13 therein. As may be seen in Fig. 2 this thrust bearing support rests on the outside surface of the member 10 and the bore 13 thereof coincides with a bore 14 in the frame member.

In the illustrated construction a thrust bearing 15 is mounted on the support 12 and is provided with a resilient supporting structure including a plurality of springs 16 arranged in circumferentially and radially spaced apart relation between the bearing 15 and the support 12. Axially spaced from the thrust bearing support I may also attach a guide bearing support 17 to the bearing housing 11 in any suitable manner, such as by welding. This guide bearing support is in the form of a flat plate member with a bore therein and attached to the guide bearing support and extending therefrom in the bore I place a guide bearing 18. Axially spaced from this guide bearing support I place a cover support 19 to which a cover 20 is attached. In order to form a support for an exciter 21 I place a flange 22 on top of the bearing housing 11.

The stationary member of the dynamo-electric machine is provided with a laminated core member 23 of magnetic material arranged inside the dished member 10 and supported therein by inner and outer side plates 24 and 25, respectively. These side plates 24 and 25 are attached to the member 10 in any suitable manner, such as welding, and the entire assembly is mounted upon a concrete supporting base 26 and is secured thereto by bolts 27 which are embedded in the concrete of this base. The core member 23 is placed between the inner and outer side plates and is wedged tightly therebetween by means of dovetail guide bolt members 28 which cooperate with both the inner and outer side plates. Furthermore, the stationary member of the machine is provided with a conventional winding 29 arranged in the core 23, which is adapted to cooperate electrodynamically with a rotatable member having laminated pole pieces 30 of magnetic material, which provide the excitation for the machine. These pole pieces 30 are mounted upon a supporting ring 31 arranged as a flywheel supported by a spider 32 on a shaft 33.

As may be seen in Fig. 2, near one end of the shaft 33 there is placed a collar member 34 which cooperates with the thrust bearing 15 and the guide bearing 18 to form a supporting arrangement for the rotatable member. The other end of the shaft 33 may rotate in a lower guide bearing 35 which is in turn supported by a three or four arm bracket member 36 mounted on the base 26. At the bottom of the shaft 33 there is bolted another shaft 37, which is in turn attached to a suitable prime mover, such as a water wheel.

Thus I have provided a combined one-piece dished or ellipsoidal dome frame and bearing bracket member of improved sturdy construction and economical manufacture, adapted to be provided with an upper bearing housing attached thereto, with a separate lower bearing bracket attached to a base member.

Modifications of the particular arrangement which I have disclosed embodying my invention will occur to those skilled in the art, so that I do not desire my invention to be limited to the particular arrangement set forth and I intend in the appended claims to cover all modifications which do not depart from the spirit and scope of my invention.

What I claim as new and desire to secure by Letters Patent of the United States is:

1. A vertical shaft dynamo-electric machine including a one-piece frame and bearing bracket member, a core member mounted therein, a rotatable member adapted to react electrodynamically with said core member, and means including a bearing housing mounted on said one-piece member and having a thrust bearing therein for supporting said rotatable member on said one-piece member.

2. A dynamo-electric machine including a one-piece ellipsoidal dome frame and bearing bracket member, a core member mounted therein, a rotatable member adapted to react electrodynamically with said core member, and means including a bearing housing mounted on said one-piece member and having a thrust bearing therein for supporting said rotatable member on said one-piece member.

3. A dynamo-electric machine including a one-piece dished frame and bearing bracket member, a core member mounted therein, a rotatable member adapted to react electrodynamically with said core member, and means including a bearing housing mounted on said one-piece member and having a thrust bearing therein for supporting said rotatable member on said one-piece member.

4. A dynamo-electric machine including a dished one-piece frame and bearing bracket member, a base member on which said one-piece member is mounted, a core member mounted in said one-piece member, a rotatable member adapted to react electrodynamically with said core member, an upper bearing housing, and a lower bearing bracket, said upper bearing housing being welded to said one-piece member and said lower bearing bracket being attached to said base member.

ALEXANDER P. WOOD.